United States Patent [19]

Ashida

[11] Patent Number: 4,514,854
[45] Date of Patent: Apr. 30, 1985

[54] DISCRIMINATION CIRCUIT FOR RECEIVED DATA

[75] Inventor: Akira Ashida, Yokohama, Japan
[73] Assignee: Hitachi, Ltd., Tokyo, Japan
[21] Appl. No.: 469,402
[22] Filed: Feb. 24, 1983
[51] Int. Cl.³ .............................................. H04L 1/00
[52] U.S. Cl. .................................... 375/94; 375/101; 371/6
[58] Field of Search ................... 375/75, 94, 101, 104, 375/106; 329/104, 107; 371/6, 46; 307/350, 360

[56] References Cited

U.S. PATENT DOCUMENTS 4,242,755 12/1980 Gauzan ................................. 375/94
4,271,523 6/1981 Gable .................................. 375/101

FOREIGN PATENT DOCUMENTS 2059224 4/1981 United Kingdom ................ 375/101

Primary Examiner—Jin F. Ng
Attorney, Agent, or Firm—Antonelli, Terry & Wands

[57] ABSTRACT

The level of a received data bit is detected at multiple instants which are determined by a clock signal having a frequency higher than that of the data bits to be received. Discrimination of the received data is carried out by considering the bit pattern of the preceding and succeeding bits with respect to the received data, on the basis of the count number of the multiple instants at which the detected levels of the received data bit fall within a specified condition. The reference level for the level detection at the multiple instants, the gate time for allowing the counting of the multiple instants and/or the threshold count number for the discrimination are altered to surely discriminate the levels of the received data bits.

6 Claims, 10 Drawing Figures

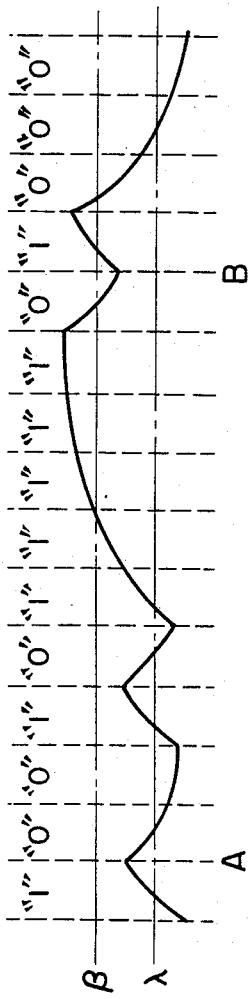

DISCRIMINATION CIRCUIT FOR RECEIVED DATA

BACKGROUND OF THE INVENTION

The present invention relates to a received data discrimination circuit for discriminating the data received in digital transmission while compensating the intersymbol interference.

Discrimination of the received data at the receiving side in a digital transmission system has heretofore been carried out by, for example, judging whether the level at the instant of the maximum amplitude within each bit period (corresponding to one bit of symbol data) exceeds a pre-established discrimination level or not.

In addition, the intersymbol interference caused by the bandwidth restriction or the like in the transmission system has heretofore been eliminated (compensated) by means of waveform equalization or the like in the analog processing approach. Accordingly, a complex, large-sized and expensive analog processing circuit has been required. These analog processing circuits have completely different circuit configurations depending on the transmission waveform, transmission medium and so on. Thus, various types of circuits have been used, resulting in lack of universality.

SUMMARY OF THE INVENTION

An object of the present invention is to overcome the above described drawbacks in the prior art and to provide a simple, universal and economical received data discrimination circuit which compensates the intersymbol interference in the received data and surely discriminates the data.

In the received data discrimination circuit according to the present invention, the received data is discriminated with respect to one or more specified discrimination levels at multiple instants by using a high frequency clock signal having a frequency which is higher than that of the clock signal of the received data, the number of the above described high frequency clocks falling in the specified discrimination range is counted in each bit period of the received data pattern, and the above described data is judged according to the counted result to be outputted.

BRIEF DESCRIPTION OF THE DRAWINGS

FIG. 1 shows an example of data waveform appearing in the data transmission.

FIGS. 2a, 2b, 2c and 2d show the relationship between received data waveforms and discrimination ranges for received data in one example.

DESCRIPTION OF THE PREFERRED EMBODIMENTS

Figure 3:
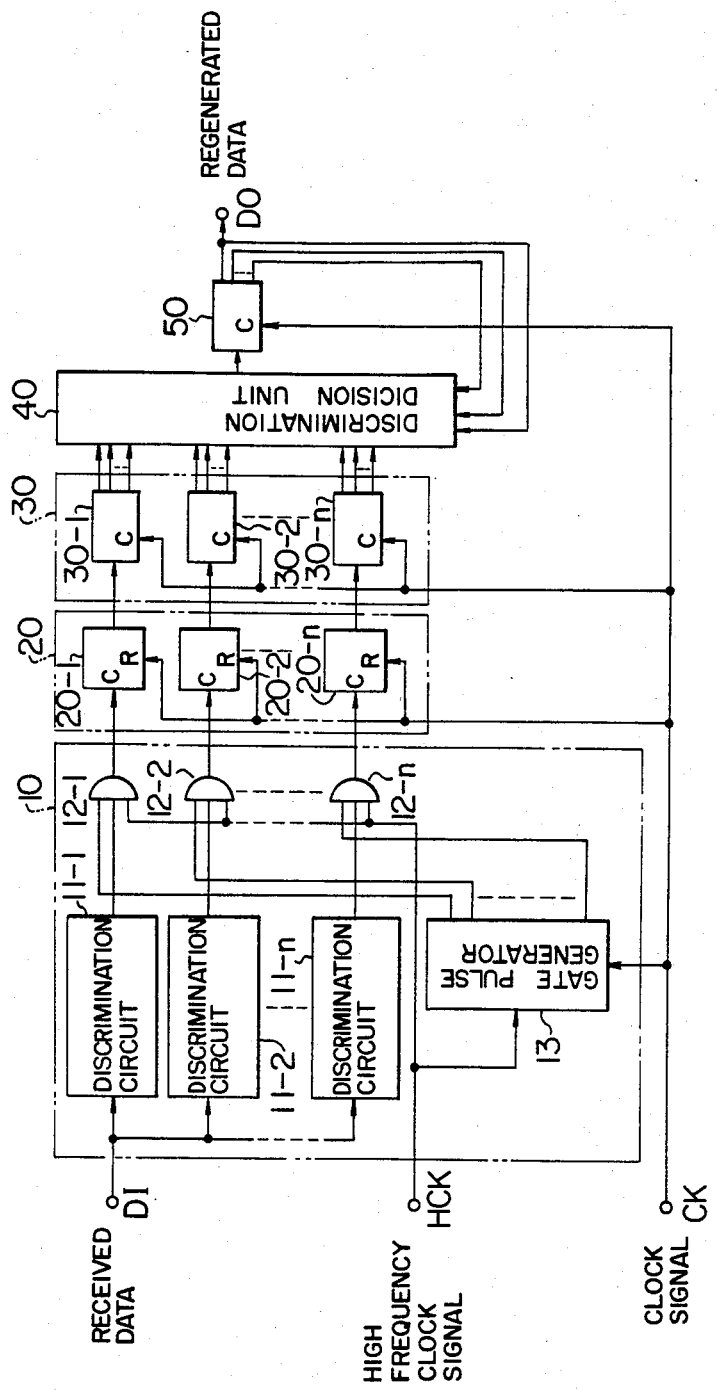
FIGS. 3, 4a, 4b, 5 and 6 are block diagrams respectively for the first to fourth embodiments of the received data discrimination circuit according to the present invention.

At first, the basic principle of the received data discrimination circuit according to the present invention will be described referring to FIG. 1 and FIGS. 2a to 2d.

FIG. 1 shows the waveform of NRZ (Non-Return to Zero) data transmitted on a cable having low-pass frequency characteristics in the data transmission. FIGS. 2a to 2d show the relationship between received waveforms and discrimination ranges for received data in one example.

As evident from FIG. 1, intersymbol interference noticeably appears on the waveform of the data transmission over the cable according to the binary code pattern depicted in the upper part of FIG. 1 (states of the codes preceding and succeeding the code concerned). When discriminating the received data waveform, therefore, it is possible to discriminate correctly the transmitted information by conducting discrimination with the discrimination level $\lambda$ at the instant A and with the discrimination level $\beta$ at the instant B. That is to say, it is understood that the use of a single discrimination level produces erroneous discrimination results and the optimum discrimination level for a particular code depends upon the states of codes preceding and succeeding the code concerned.

Referring to FIGS. 2a to 2d which show basic binary code patterns, it will be hereafter explained that even in the multiple-instant discrimination approach using a high frequency clock signal, occurrence of erroneous code discrimination is affected by the intersymbol interference according to the states of codes preceding and succeeding the code concerned, i.e., the binary code pattern.

FIG. 2a shows the received data waveform having a pattern of the "1X1" form. The code which is to be discriminated between "1" and "0" is represented by "X". If the "X" is judged to be "1" under the condition that the number of the high frequency clocks at which it has been judged to be "1" within that bit period has reached a majority in the total number corresponding to that bit period, the code "X" is more liable to produce an error when it is "0" than "1" as evident from FIG. 2a.

In the patterns of the "1X0" form shown in FIG. 2b and "0X1" form shown in FIG. 2c, there is no difference between the error rate when the code "X" is "1" and that when the code "X" is "0". In the pattern of the "0X0" form shown in FIG. 2d, the code "X" which is "0" is more liable to produce an error as compared with "1".

In each pattern, near the maximum power level when the code "X" to be discriminated is "1", the gate pulse is rendered to be produced. For the pattern "0X0", it is evidently optimum to place the threshold for judging either "1" or "0" in the multiple-instant discrimination approach at half of the number of high frequency clocks existing in the period of the concerned gate pulse width. For other patterns, it is optimum to place the threshold at a number which somewhat exceeds half of the number of high frequency clocks existing in the period of the concerned gate pulse width.

In short, the selection of the gate pulse waveform is carried out according to how the transition portion in the received data waveform is handled. That is to say, by commonly applying the gate pulse waveform used for the pattern "0X0" as illustrated in FIG. 2d to other patterns, it is possible to obtain a discrimination threshold having no pattern-dependent effect and adopt the same number of high frequency clocks as the discrimination threshold for every pattern.

If the gate pulse having the width of one bit period is commonly applied to every pattern, a different number of high frequency clocks must be adopted as the discrimination threshold for each pattern.

To be brief, because of the delay and amplitude characteristics of the transmission path, the transmitted data waveform is varied depending upon the information states before and after the discrimination instant concerned. Accordingly, the noise added to the waveform might produce a code error. For surely discriminating the concerned data from the received data waveform without using a complex equalizer circuit, therefore, it is intended to suppress such a code error to the minimum by selecting a suitable discrimination level and adopting the multiple-instant discrimination approach having a noise cancelling effect.

Hereinafter, embodiments of the present invention will be described referring to the accompanying drawings.

FIG. 3 is a block diagram of the first embodiment of the received data discrimination circuit according to the present invention.

In FIG. 3, numeral 10 denotes a multiple-instant discrimination unit, numerals 11-1 to 11-n denote discrimination circuits included in said multiple-instant discrimination unit 10, numerals 12-1 to 12-10 denote AND gates included in said unit 10, numeral 13 denotes a gate pulse generator included in said unit 10, numeral 20 denotes a counter unit, numerals 20-1 to 20-n denote counters included in said counter unit 20, numeral 30 denotes a memory unit, numerals 30-1 to 30-n denote shift registers included in said memory unit 30, numeral 40 denotes a discrimination decision unit, and numeral 50 denotes a shift register provided as the output unit.

The circuit illustrated in FIG. 3 shows the embodiment which is the most basic. By using j bits of the received data DI which precede the concerned bit at the concerned discrimination instant and have already been discriminated as well as the succeeding k bits which are pre-discriminated under the specified conditions, one of $2^{j+k}=n$ possible combinations is obtained. The bit at the concerned discrimination instant is determined depending upon the resultant combination.

First of all, the received data DI enters the multiple-instant discrimination unit 10 and is subjected to amplitude discrimination in the discrimination circuits 11-1 to 11-n having specified discrimination levels $l_1$ to $l_n$, respectively.

A gate pulse generator 10 generates specified gate pulses depending upon a clock signal CK for the received data DI and a high frequency clock signal HCK having a frequency which is higher than that of a clock signal CK. According to the above described discrimination results obtained from the discrimination circuits 11-1 to 11-n and the specified gate pulses generated by the gate pulse generator 13, AND gates 12-1 to 12-n are opened to send out pulses of the high frequency clock signal HCK during that period.

These pulses are fed to the counter unit 20 and are counted in the counters 20-1 to 20-n respectively having maximum countable values $M_1$ to $M_n$. The counters 20-1 to 20-n provide outputs "1" when respective maximum countable values $M_1$ to $M_n$ are attained within one period of the clock signal CK and provide outputs "0" when not attained.

These outputs are fed into the memory unit 30 and stored in the shift registers 30-1 to 30-n respectively having (k+1) stages wherein the data is shifted by the clock signal CK. Thereafter, each of the k-bit outputs from the shift registers 30-1 to 30-n are fed to the discrimination decision unit 40.

From the j-stage shift register 50 for storing the j-bit data which has already been discriminated, the j-bit data preceding the bit to be discriminated is fed back to the discrimination decision unit 40. According to the optimum condition for the j-bit data thus fed back and predetermined k-bit data excluding the last bit corresponding to the concerned decision instant from the above described (k+1) bits, the discrimination decision unit 40 determines the concerned bit and feeds the resultant data into the shift register 50.

Each time the data is fed to the shift register 50, the shift register 50 sends out the leading bit in the stored bits becoming the regenerated data "DO".

Reverting to the discrimination decision circuit 40, the circuit must be suitably constituted according to the transmission code in use and transmission characteristics. The discrimination decision circuit 40 in this embodiment is so configured as to carry out optimum discrimination by using n outputs from the final stages in shift registers 30-1 to 30-n at each discrimination instant (bit), according to the bit pattern before and after the concerned bit.

Hereinafter, more practical embodiments will be successively described.

Figure 4A:
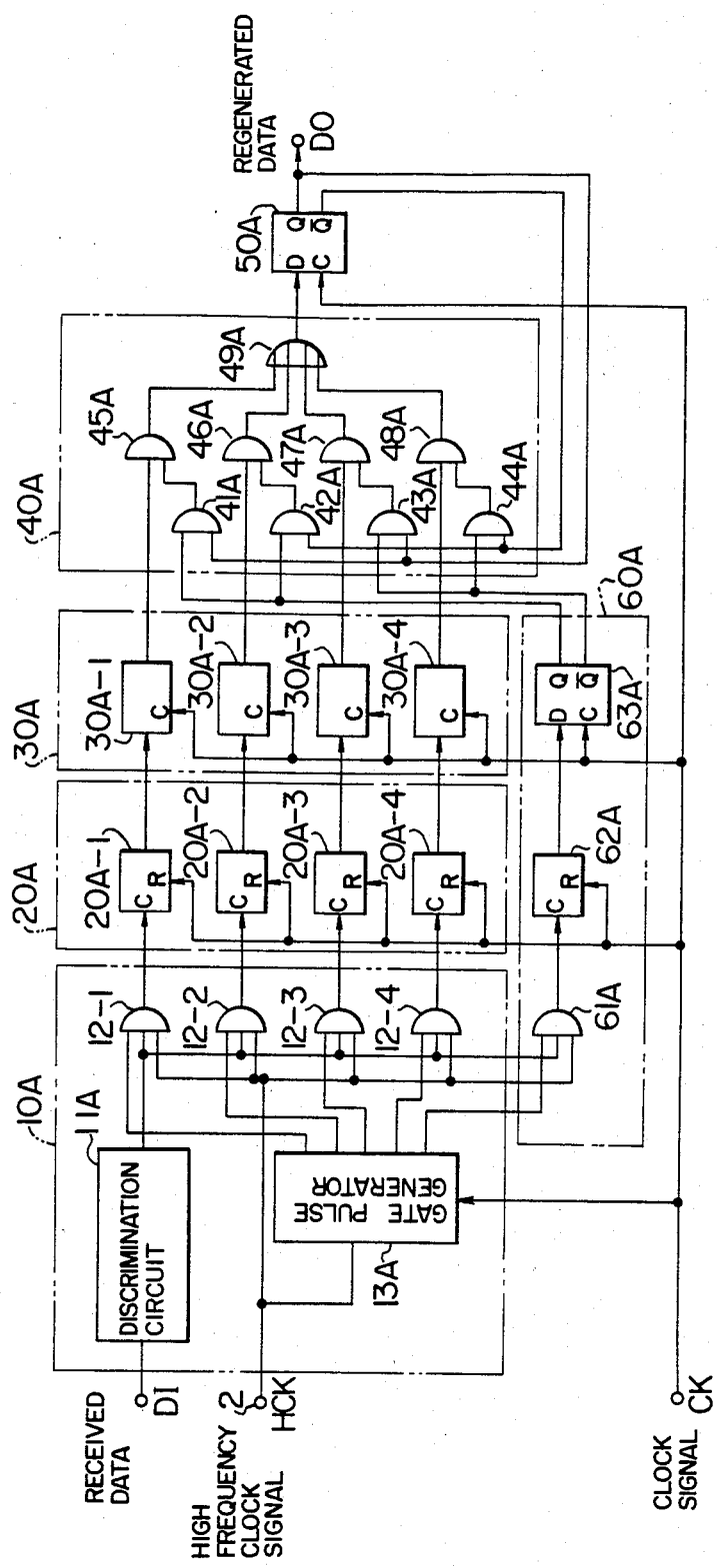

FIG. 4a is a block diagram of the second embodiment of the received data discrimination circuit which carries out discrimination by using the related two single bits positioned before and after the discrimination instant according to the present invention.

In FIG. 4a, numeral 10A denotes a multiple-instant discrimination unit, numeral 11A denotes a discrimination circuit included in said multiple-instant discrimination unit 10A, numerals 12-1 to 12-4 denote AND gates included in said unit 10A, numeral 13A denotes a gate pulse generator included in said unit 10A, numeral 20A denotes a counter unit, numerals 20A-1 to 20A-4 denote counters included in said counter unit 20A, numeral 30A denotes a memory unit, numerals 30A-1 to 30A-4 denote shift registers included in said memory unit 30A, numeral 40A denotes a discrimination decision unit, numerals 41A to 48A denote AND gates included in said discrimination decision unit 40A, numeral 49A denotes an OR gate included in said unit 40A, numeral 50A denotes a D flip-flop provided as the output unit, numeral 60A denotes a state pre-discrimination unit, numeral 61A denotes an AND gate included in said state discrimination unit 60A, numeral 62A denotes a counter included in said unit 60A, and numeral 63A denotes a D flip-flop included in said unit 60A.

In this embodiment, the number of related bits positioned before and after the discrimination instant (bit) is selected as j=k=1. Accordingly, the number of discrimination conditions n is expressed as $n=2^2=4$. Since only one discrimination level is employed, the multiple-instant discrimination unit 10A contains only one discrimination circuit 11A.

Further, the function of predetermining the state of the bit appearing before the bit discrimination instant to determine the discrimination condition is extracted and concentrated into the state pre-discrimination unit 60A.

Since the number n of discrimination conditions is 4 as described above, description will be given for the NRZ code illustrated in FIG. 2. In this case, the multiple-instant discrimination unit 10A and the state pre-discrimination unit 60A may be simplified as represented by 10A' and 60A' in FIG. 4b.

At first, the gate pulse generator 13A in the multiple-instant discrimination unit 10A' need not produce any pulse for the pattern of "1X1" form described before. Because the counter 20A-1 included in the counter unit 20A is reset by the clock signal CK applied to its reset terminal R upon the rising of the concerned gate pulse, bringing about the same effect as the production of the gate pulse. For other patterns, i.e., "1X0" form, "0X1" form and "0X0" form, the gate pulse generator 13A generates respective gate pulses as illustrated in FIGS. 2b to 2d and feeds them to the AND gates 12-2, 12-3 and 12-4 respectively.

The counters 20A-1, 20A-2, 20A-3 and 20A-4 included in the counter unit 20A respectively correspond to patterns of "1X1" form, "1X0" form, "0X1" form and "0X0" form. Assuming that N is the number of pulses of the high frequency clock signal HCK existing in the bit period T, the value established in the counter is $N/2+\alpha$ for the counter 20A-1, $N/2$ for the counter 20A-2, $N/2$ for the counter 20A-3, and $N/2-\alpha$ for the counter 20A-4. Where, $\alpha$ represents the number of pulses of the high frequency clock signal HCK corresponding to the jitter width of the received data DI or the rise time and fall time of the received data waveform.

Each of shift registers 30A-1 to 30A-4 included in the memory unit 30A is composed of 2 stages according to the equation expressed as $k+1=1+1=2$.

The discrimination decision unit 40A is composed of AND gates 41A to 44A, AND gates 45A to 48A, and an OR gate 49A. Outputs Q and $\overline{Q}$ of the D flip-flop represent the discriminated result for the bit preceding the bit concerned. Outputs Q and $\overline{Q}$ of the D flip-flop 63A in the state pre-discrimination unit 60A represent the pre-discriminated result for the bit succeeding the bit concerned. The AND gates 41A to 44A select a discrimination condition according to the outputs Q and $\overline{Q}$ from the D flip-flop 50A and the outputs Q and $\overline{Q}$ from the D flip-flop 63A. Outputs from AND gates 41A to 44A and outputs from the shift registers 30A-1 to 30A-4 enter the AND gates 45A to 48A for passing the discrimination result which satisfied the selected discrimination condition. The OR gate 49A passes outputs of AND gates 45A to 48A.

The output from the above described OR gate 49A is fed to the D flip-flop 50A which is provided as the output unit. The D flip-flop 50A is triggered by the clock signal CK to send out its output Q as the regenerated data DO.

The remaining operation will not be described since it is understandable from the description of the embodiment shown in FIG. 3.

In the embodiment shown in FIG. 4, the state pre-discrimination unit 60A is provided. Instead of thus providing the state pre-discrimination unit 60A, the output of the first stage in the shift register 30A-4 which is provided for the pattern of the "0X0" form may be employed as the discrimination condition input. This approach is equivalent to an embodiment of the discrimination decision unit 40 shown in FIG. 3.

Figure 5:
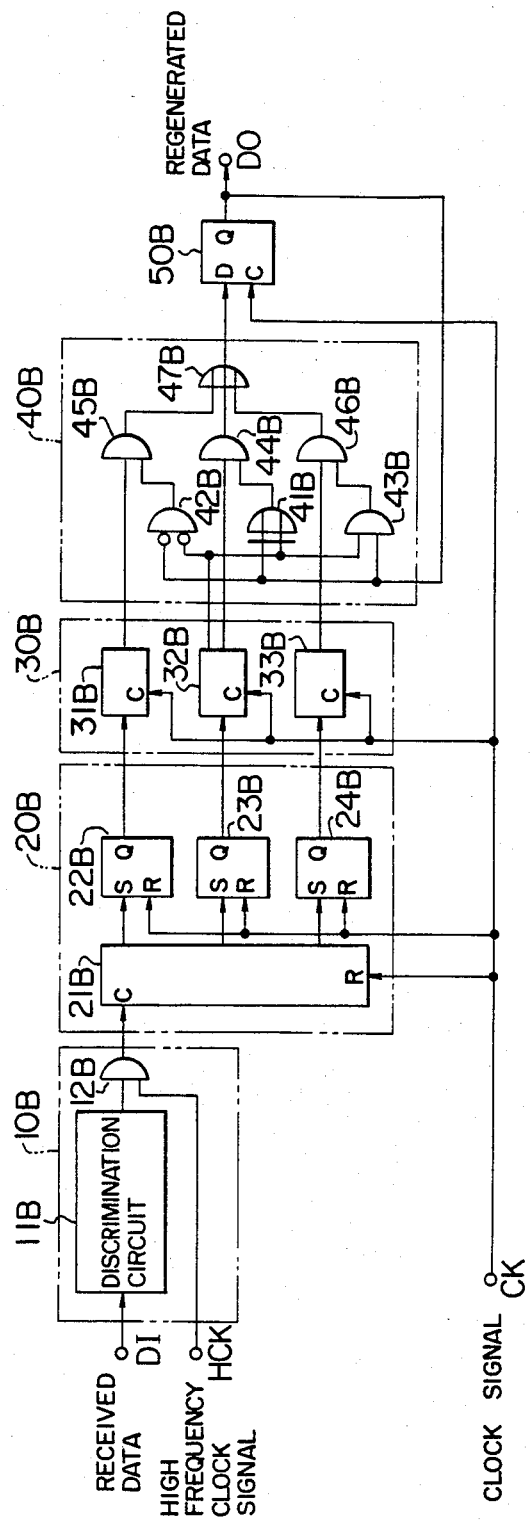

FIG. 5 shows the block diagram of the third embodiment of the received data discrimination circuit according to the present invention.

In the third embodiment shown in FIG. 5, the circuit has been simplified compared with the second embodiment shown in FIG. 4a by employing a single type of gate pulse which has a width equivalent to the bit period for every pattern in the received data.

In FIG. 5, numeral 10B denotes a multiple-instant discrimination unit, numeral 11B denotes a discrimination circuit included in said multiple-instant discrimination unit 10B, numeral 12B denotes an AND gate included in said unit 10B, numeral 20B denotes a counter unit, numeral 21B denotes a counter included in said counter unit 20B, numerals 22B to 24B denote RS flip-flops included in said counter unit 20B, numeral 30B denotes a memory unit, numerals 31B to 33B denote shift registers included in said memory unit 30B, and numeral 40B denotes a discrimination decision unit. In the discrimination decision unit 40B, numeral 41B denotes an exclusive OR gate, numerals 42B to 46B denote AND gates and numeral 47B denotes an OR gate. Numeral 50B denotes a D flip-flop provided as the output unit.

Figure 4B:
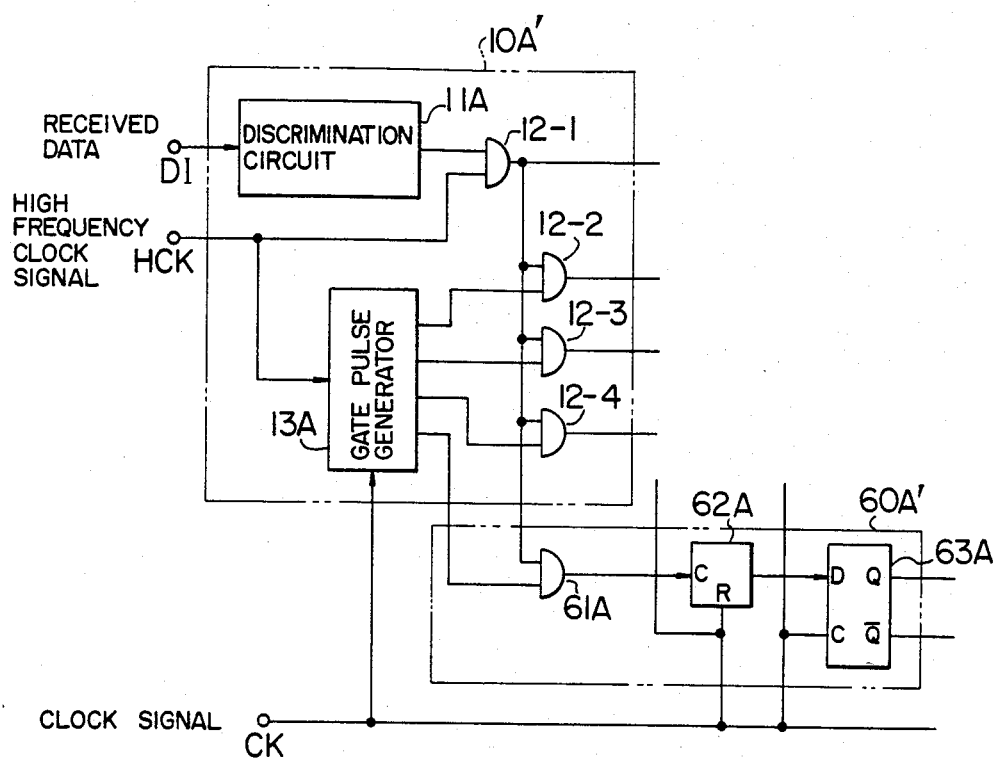

In the same way as FIG. 4a and FIG. 4b, description will be given for the NRZ code. The received data DI is subjected to amplitude discrimination in the discrimination circuit 11B. The resultant output of the discrimination circuit 11B and a high frequency clock signal HCk are fed to the AND gate 12B. Only while the above described discrimination result is "1", pulses of the high frequency clock signal HCK are passed through the AND gate 12B and then fed to the counter unit 20B to be counted in the counter 21B.

When the counted value in the counter 21B has reached $N/2+\alpha$, $N/2-\alpha$ and $N/2$ respectively established for patterns of "1X1" form, "0X1" form and "1X0" form, the counter 21B feeds pulses to the RS flip-flops 22B, 23B and 24B to set them. N and $\alpha$ are the same as those described before referring to FIG. 4. The RS flip-flops are reset by the clock signal appearing thereafter.

Outputs from the RS flip-flops 22B, 23B and 24B are successively stored in 2-stage shift registers 31B, 32B and 33B in the memory unit 30B, respectively.

The discrimination decision unit 40B acquires discrimination condition from the above described shift registers 31B, 32B and 33B as well as the D flip-flop 50B and discriminates the received data DI by using logic function through various gates in the same way as the embodiment shown in FIG. 4a.

Figure 6:
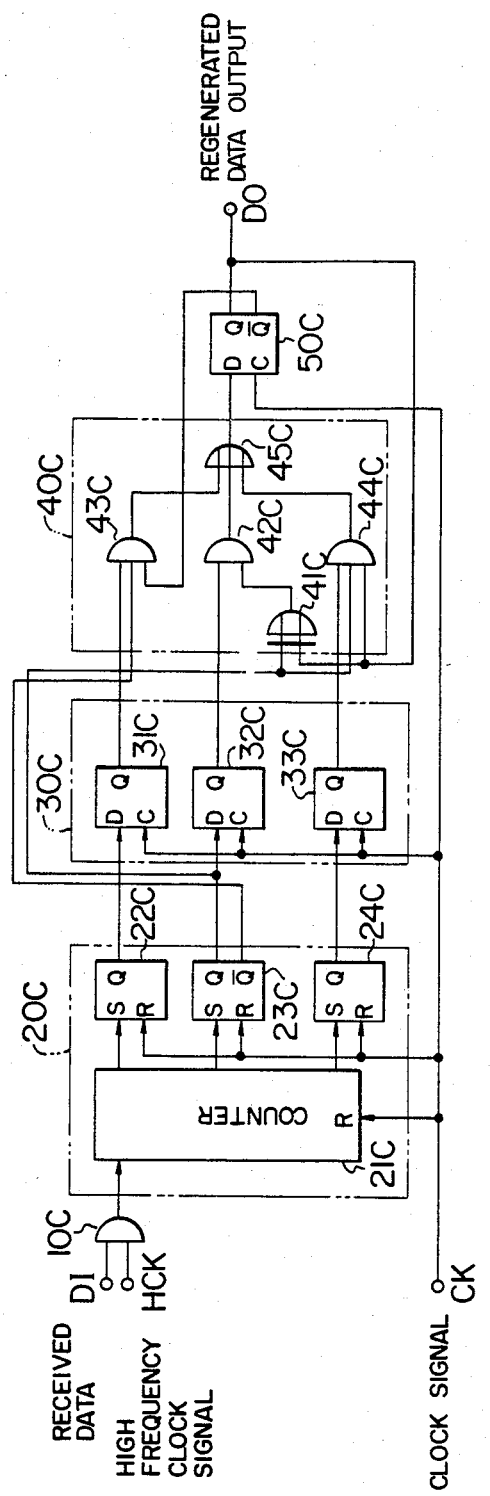

Last of all, FIG. 6 shows a block diagram of the fourth embodiment of the received data discrimination circuit according to the present invention. In FIG. 6, the circuit has been further simplified as compared with the embodiment shown in FIG. 5.

In FIG. 6, numeral 10C denotes an AND gate provided as the multiple-instant discrimination unit, numeral 20C denotes a counter unit, numeral 21C denotes a counter included in said counter unit 20C, numerals 22C, 23C and 24C denote RS flip-flops included in said counter unit 20C, numeral 30C denotes a memory unit, numerals 31C, 32C and 33C denote D flip-flops included in said memory unit 30C, and numeral 40C denotes a discrimination decision unit. In the discrimination decision unit 40C, numeral 41C denotes an exclusive OR gate, numerals 42C, 43C and 44C denote AND gates, and numeral 45C denotes an OR gate. Numeral 50C denotes a D flip-flop provided as the output unit.

In this embodiment, the multiple-instant discrimination unit is composed of the AND gate 10C alone. Instead of 2-stage shift registers, the memory unit 30C is composed of one-stage registers, i.e., D flip-flops 31C, 32C and 33C.

Such simplification has become possible because the operation of the counter unit 20C, the memory unit 30C and the output portion (D flip-flop 50C) are synchronized with the clock signal CK. The remaining operation is similar to that of the embodiment shown in FIG. 5, and hence will not further be described.

In the above described embodiments, it is possible to cope with diversified transmission codes, transmission characteristics or the like by choosing optimum values as parameters including the discrimination level, gate pulse waveform and established counter value.

According to the present invention, as heretofore described in detail, it is possible to suppress the code error caused by the distortion in the transmitted waveform and the intersymbol interference due to the pattern-dependent transmission characteristics, the received data being surely discriminated. Since the circuit according to the present invention is composed of digital circuits, it can be easily produced in the IC form. Thus, it becomes possible to realize a simple, economical and universal received data discrimination circuit, bringing about a noticeable effect.

I claim:

1. A discrimination circuit for received data comprising:
   a multiple-instant discrimination unit including means for discriminating the amplitude of received data with respect to one or more specified discrimination levels, means for providing gate pulses defined by a pattern in the received data, means responsive to the amplitude discrimination result and the gate pulses for passing pulses of a high frequency clock signal for each of said discrimination levels, said high frequency clock signal having a frequency which is higher than that of a clock signal of said received data;
   a counter unit including means for counting pulses fed from said passing means said multiple-instant discrimination unit and for sending out values of respective bits of said received data to store the output from said counting means as values representing each data bit to be discriminated, with the capability of storing a specified number of bits by successively shifting said bits;
   a memory unit which receives the output from said counter unit and stores a bit to be discriminated as well as a specified number of succeeding bits while successively shifting them;
   a discrimination decision unit including means for determining the value of said bit to be discriminated according to the discrimination condition defined by the contents stored in said counter unit and a specified number of bits preceding said bit to be discriminated which have already been discriminated;
   an output unit including means for storing the output of said discrimination decision unit while successively shifting the stored bits, for sending out the leading bit in the stored bits as regenerated data for said received data, and for feeding back all of stored bits to said discrimination decision unit as already discriminated results of a specified number of bits preceding said bit to be discriminated.

2. A discrimination circuit for received data according to claim 1, wherein the duration of said gate pulse in said multiple-instant discrimination unit is equal to the width of the bit period and wherein said multiple-instant discrimination unit includes gate means whose input threshold level serves as the specified discrimination level.

3. A discrimination circuit for received data according to claim 1, wherein the duration of said gate pulse in said multiple-instant discrimination unit is equal to the width of the bit period.

4. A discrimination circuit for received data according to claim 1, wherein said multiple-instant discrimination unit includes a single discrimination circuit which discriminates the amplitude of the received data with a single specified discrimination level.

5. A discrimination circuit for received data according to claim 4, wherein the duration of said gate pulse in said multiple-instant discrimination unit is equal to the width of the bit period.

6. A discrimination circuit for received data according to claim 4, wherein the duration of said gate pulse in said multiple-instant discrimination unit is equal to the width of the bit period and wherein said multiple-instant discrimination unit includes gate means whose input threshold level serves as the specified discrimination level.

* * * * *

UNITED STATES PATENT AND TRADEMARK OFFICE
CERTIFICATE OF CORRECTION

PATENT NO. : 4,514,854
DATED : April 30, 1985
INVENTOR(S) : Akira ASHIDA

It is certified that error appears in the above—identified patent and that said Letters Patent is hereby corrected as shown below:

On the title page;
Foreign Application Priority Data

February 24, 1982 [JP]          Japan..........57-27465

Signed and Sealed this

Eighth Day of October 1985

[SEAL]

Attest:

Attesting Officer

DONALD J. QUIGG

Commissioner of Patents and Trademarks—Designate